United States Patent
Atia et al.

(10) Patent No.: US 10,528,374 B2
(45) Date of Patent: Jan. 7, 2020

(54) VOLUME MANAGEMENT BY VIRTUAL MACHINE AFFILIATION AUTO-DETECTION

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Ran Harel, Kfar-Saba (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 15/246,938

(22) Filed: Aug. 25, 2016

(65) Prior Publication Data
US 2018/0060098 A1 Mar. 1, 2018

(51) Int. Cl.
*G06F 9/455* (2018.01)
*G06F 3/06* (2006.01)

(52) U.S. Cl.
CPC .......... *G06F 9/45558* (2013.01); *G06F 3/065* (2013.01); *G06F 3/0605* (2013.01); *G06F 3/067* (2013.01); *G06F 3/0619* (2013.01); *G06F 3/0653* (2013.01); *G06F 3/0665* (2013.01); *G06F 3/0689* (2013.01); *G06F 2009/45591* (2013.01)

(58) Field of Classification Search
CPC .... G06F 9/45558; G06F 3/0619; G06F 3/065; G06F 3/0689; G06F 3/0665; G06F 2009/45583
See application file for complete search history.

(56) References Cited

U.S. PATENT DOCUMENTS

| | | | |
|---|---|---|---|
| 7,546,601 B2 | 6/2009 | Byrd et al. | |
| 7,630,955 B2 | 12/2009 | Byrd et al. | |
| 7,661,135 B2 | 2/2010 | Byrd et al. | |
| 8,689,054 B1 | 4/2014 | Van Der Goot | |
| 8,694,679 B2 | 4/2014 | Sugai | |
| 8,756,600 B2 | 6/2014 | Mori | |
| 8,862,744 B2* | 10/2014 | Garg | H04L 43/0882 370/236 |
| 8,904,008 B2 | 12/2014 | Calder et al. | |
| 9,195,490 B2 | 11/2015 | Kruglick | |
| 2006/0036579 A1 | 2/2006 | Byrd et al. | |
| 2006/0059118 A1 | 3/2006 | Byrd et al. | |
| 2011/0225277 A1* | 9/2011 | Freimuth | G06F 9/45558 709/223 |
| 2013/0054807 A1* | 2/2013 | Sherwood | H04L 67/1095 709/226 |
| 2015/0128131 A1 | 5/2015 | Cao et al. | |

(Continued)

OTHER PUBLICATIONS

Li et al., "Lets Stay Together: Towards Traffic Aware Virtual Machine Placement in Data Centers," IEEE Infocom 2014, IEEE Conference on Comp Communications, 2014 (9 pages).

*Primary Examiner* — Michael Alsip
(74) *Attorney, Agent, or Firm* — Griffiths & Seaton PLLC (57) ABSTRACT

Embodiments for volume management in a data storage environment. A network sniffing operation between virtual machines is performed to detect relationships between the virtual machines and thereby identify candidates for subsequent storage volume affiliation operations.

15 Claims, 8 Drawing Sheets

(56) References Cited

U.S. PATENT DOCUMENTS

2015/0277955 A1\* 10/2015 Iwamatsu ........... G06F 9/45558
　　　　　　　　　　　　　　　　　　　　　　　　718/1
2015/0371355 A1　 12/2015 Chen
2016/0285906 A1\* 　9/2016 Fine .................... G06F 9/45558

\* cited by examiner

VOLUME MANAGEMENT BY VIRTUAL MACHINE AFFILIATION AUTO-DETECTION

BACKGROUND OF THE INVENTION

Field of the Invention

The present invention relates in general to computing systems, and more particularly to, various embodiments for storage volume management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for volume management in a data storage environment, by a processor are provided. In one embodiment, by way of example only, a method comprises performing a network sniffing operation between virtual machines to detect relationships between the virtual machines and thereby identify candidates for subsequent storage volume affiliation operations.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Disaster recovery systems typically address a sudden catastrophic failure at a single point in time. To assist in recovery of data, a copy of data may be provided at a remote location. Such dual or shadow copies are typically made as the application system is writing new data to a primary storage device. Different copy technologies well known to those skilled in the art may be used for maintaining remote copies of data at a secondary site.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. The integrity of data updates is related to insuring that updates are done at the secondary volumes in the volume pair in the same order as they were done on the primary volume.

In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. The consistency time is the latest time to which the system guarantees that updates to the secondary volumes are consistent. Consistency groups maintain data consistency across volumes and storage devices. Thus, when data is recovered from the secondary volumes, the recovered data will be consistent. For instance, if a failure occurs, the deposit will be written to the secondary volume before the withdrawal. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group.

Because these volume consistency groups are used in cases where several volumes need to be kept consistent with each other, whether by taking a point-in-time snapshot together or replicated together into a target consistency group, it stands to reason that volumes of virtual machines (VMs) or hosts that are connected and work together (e.g. forming an application with several VMs being involved) should and will reside in the same consistency group. Currently, however, consistency group VM/volume affiliation is done entirely manually, or, in some cases, arbitrarily. That is, a storage administrator must define the volume consistency groups and services by manual research and input of the volumes and associated VMs. In some cases, a virtualization administrator may define volumes of several VMs to reside in the same consistency group, also manually.

In view of the foregoing, a need exists for a mechanism whereby storage volume affiliation operations may be processed automatically or semi-automatically, such that recommendations be provided to the storage administrator regarding closely connected VMs whose volumes should be affiliated.

Accordingly, the mechanisms of the present invention implement such functionality as performing network analyses between virtual machines to detect storage volume affiliations between the virtual machines and hence identify and thereby recommend to a user, candidates for subsequent storage volume affiliation operations.

It is important to note that throughout the disclosure, the term "storage volume affiliation operations" is used for simplicity while describing many related volume grouping operations included in a computing storage environment. Storage volume affiliation operations, or more simply "volume affiliation operations" may comprise storage volume consistency grouping operations, storage volume mirroring operations, storage volume migration operations, storage services operations, or any other volume grouping operations as commonly known in the art. Storage services operations are meant as providing a logical unit representing a storage space with specific capabilities aimed to service a group of affiliated VMs having similar technological needs.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
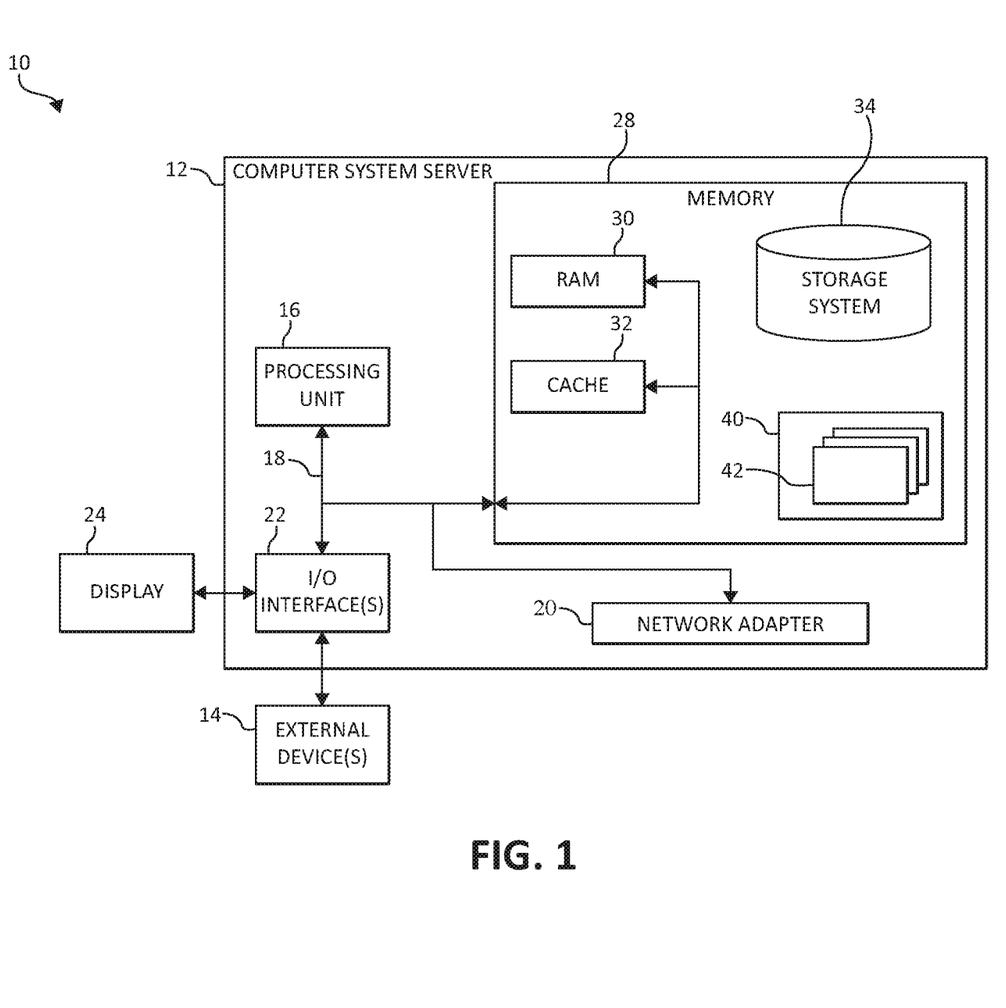
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
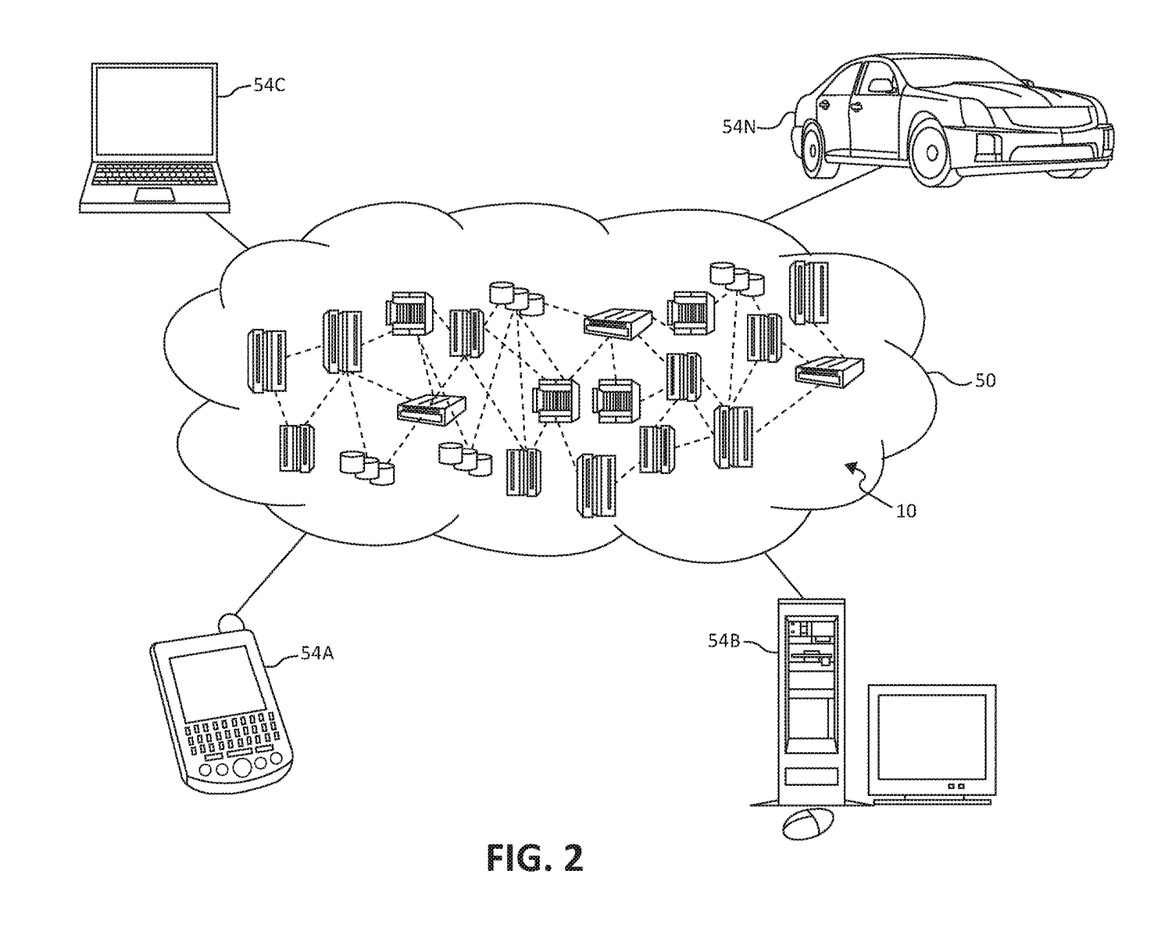
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
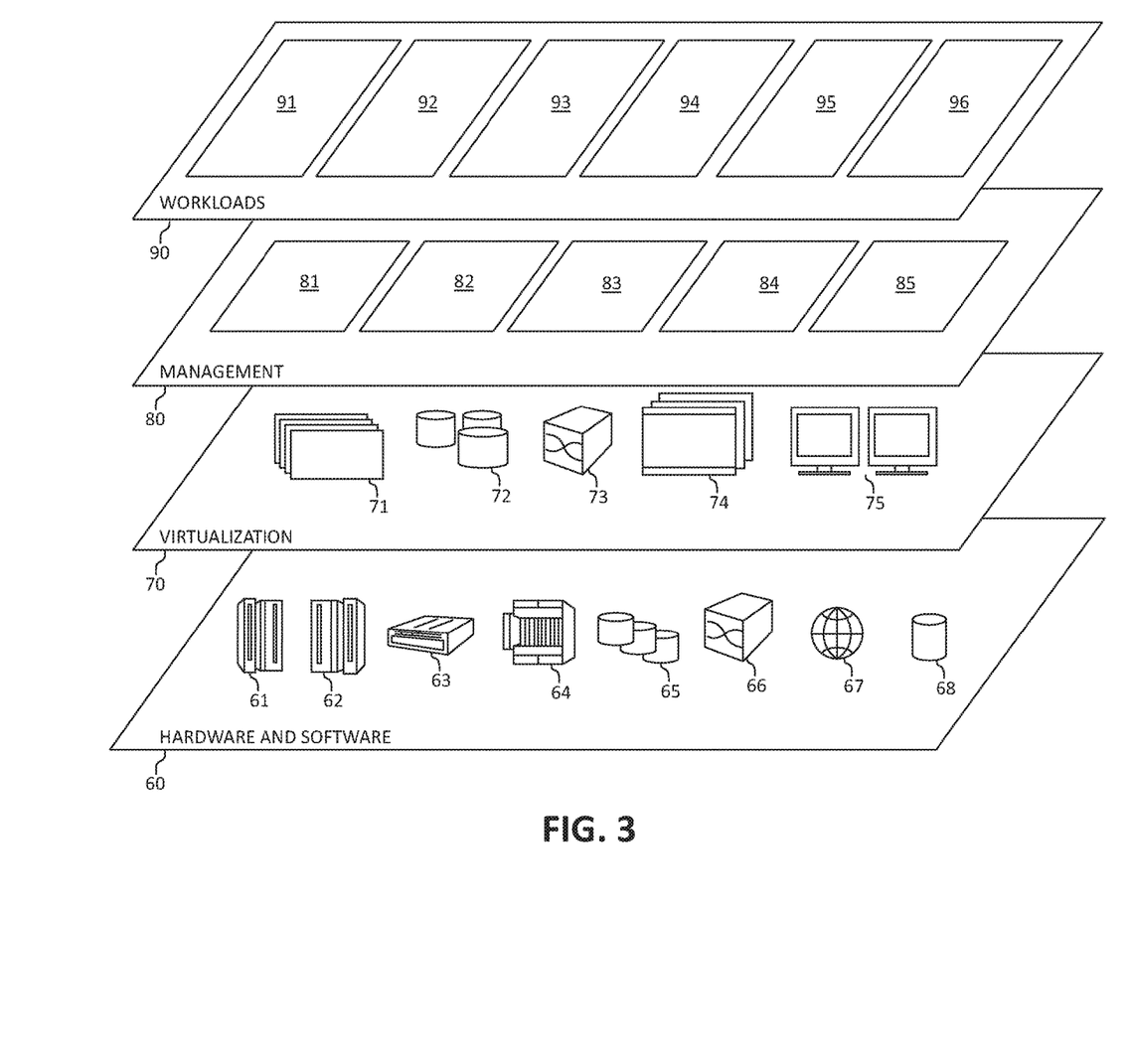
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 96, such as antivirus scanning workloads, or anti-malware scanning workloads. In addition, data security workloads and functions 96 may include such operations as data quarantining and/or data deleting functions. One of ordinary skill in the art will appreciate that the data security workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
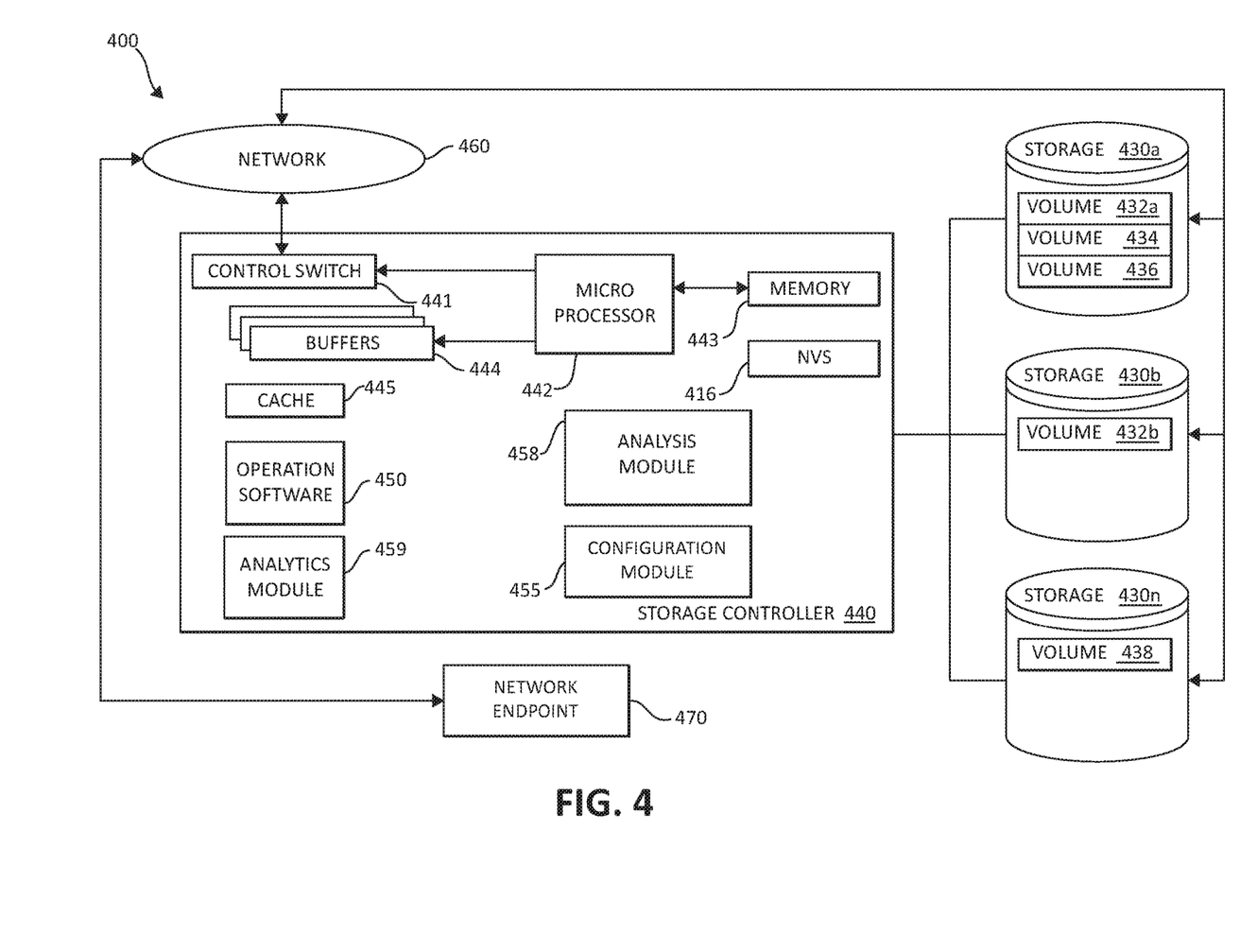
FIG. 4 is an additional block diagram depicting an exemplary hardware structure of a computing storage system in communication with the cloud computing environment, in which aspects of the present invention may be realized.

FIG. 4, following, is an additional block diagram showing a hardware structure of a data management system 400 that may be used in the overall context (i.e., as a portion of a distributed computing environment) of performing functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter 460 to the storage controller 440, such as Fibre channel, FICON, ESCON, Ethernet, fiber optic, wireless, or coaxial adapters. Network management system 400 is accordingly equipped with a suitable fabric (not shown in FIG. 4) or network adaptor 460 to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 460, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG.

4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430a, 430b and 430n are shown as ranks in data storage system 400, and are referred to herein as rank 430a, 430b and 430n. Ranks may be local to data storage system 400, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 460. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455 and an analysis module 458, among other functional components. The configuration module 455 and analysis module 458 may operate in conjunction with each and every component of the storage controller 440, and storage devices 430. The configuration module 455 and analysis module 458 may be structurally one complete module or may be associated and/or included with other individual modules. The configuration module 455 and analysis module 458 may also be located at least partially in the cache 445 or other components, as one of ordinary skill in the art will appreciate.

The configuration module 455 and analysis module 458 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The analysis module 458 may use data analytics to identify, organize, create, delete, sequester, or perform other actions on various patterns, trends, and other characteristics identified in the tracked and scanned data over the network 460 and between other distributed computing components in a distributed computing environment. As one of ordinary skill in the art will appreciate, the configuration module 455 and analysis module 458 may make up only a subset of various functional and/or functionally responsible entities in the data storage system 400.

Other ancillary hardware may be associated with the storage system 400. For example, as shown, the storage controller 440 includes a control switch 441, a microprocessor 442 for controlling all the storage controller 440, a nonvolatile control memory 443 for storing a microprogram (operation software) 450 for controlling the operation of storage controller 440, data for control, cache 445 for temporarily storing (buffering) data, and buffers 444 for assisting the cache 445 to read and write data, a control switch 441 for controlling a protocol to control data transfer to or from the storage devices 430, the configuration module 455, analysis module 458, or other blocks of functionality, in which information may be set. Multiple buffers 444 may be implemented with the present invention to assist with the operations as described herein.

Figure 5:
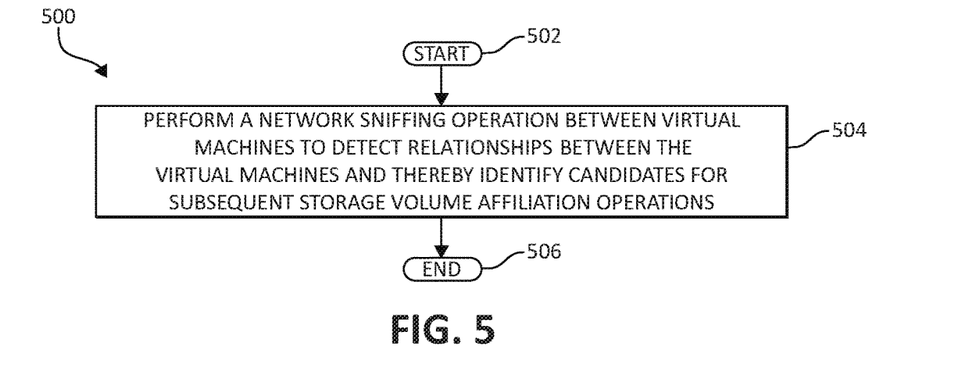
FIG. 5 is a flowchart diagram illustrating an exemplary method for volume management in a data storage environment by a processor, in which aspects of the present invention may be implemented.

Continuing, FIG. 5 illustrates a method 500 for volume management in a data storage environment, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) by performing a network sniffing operation between virtual machines to detect relationships between the virtual machines and thereby identify candidates for subsequent storage volume affiliation operations (step 504). The method 500 ends (step 506).

As aforementioned, the present invention employs network traffic analyses between VMs (or hosts) to distinguish affiliations between the VMs and thereby provide a user with recommendations of detected storage volumes to include in volume affiliation operations. Affiliations of VMs and their associated storage volumes may be deduced by using a network sniffing operation which monitors network traffic between the VMs to identify the most-connected VMs and associated storage volumes therein. That is, the network sniffing operation may monitor input/output (I/O) traffic between VMs to identify which VMs transfer the most I/O between one another and/or to which associated storage volumes. In some embodiments, the network sniffing operation may detect certain patterns in I/O traffic between VMs, or other such algorithms as defined by the user. The network sniffing operation may also identify affiliations by detecting similarities in naming of the VMs and/or their associated storage volumes, similarities between installed application packages between the VMs, or other categories as defined by the user.

Figure 6:
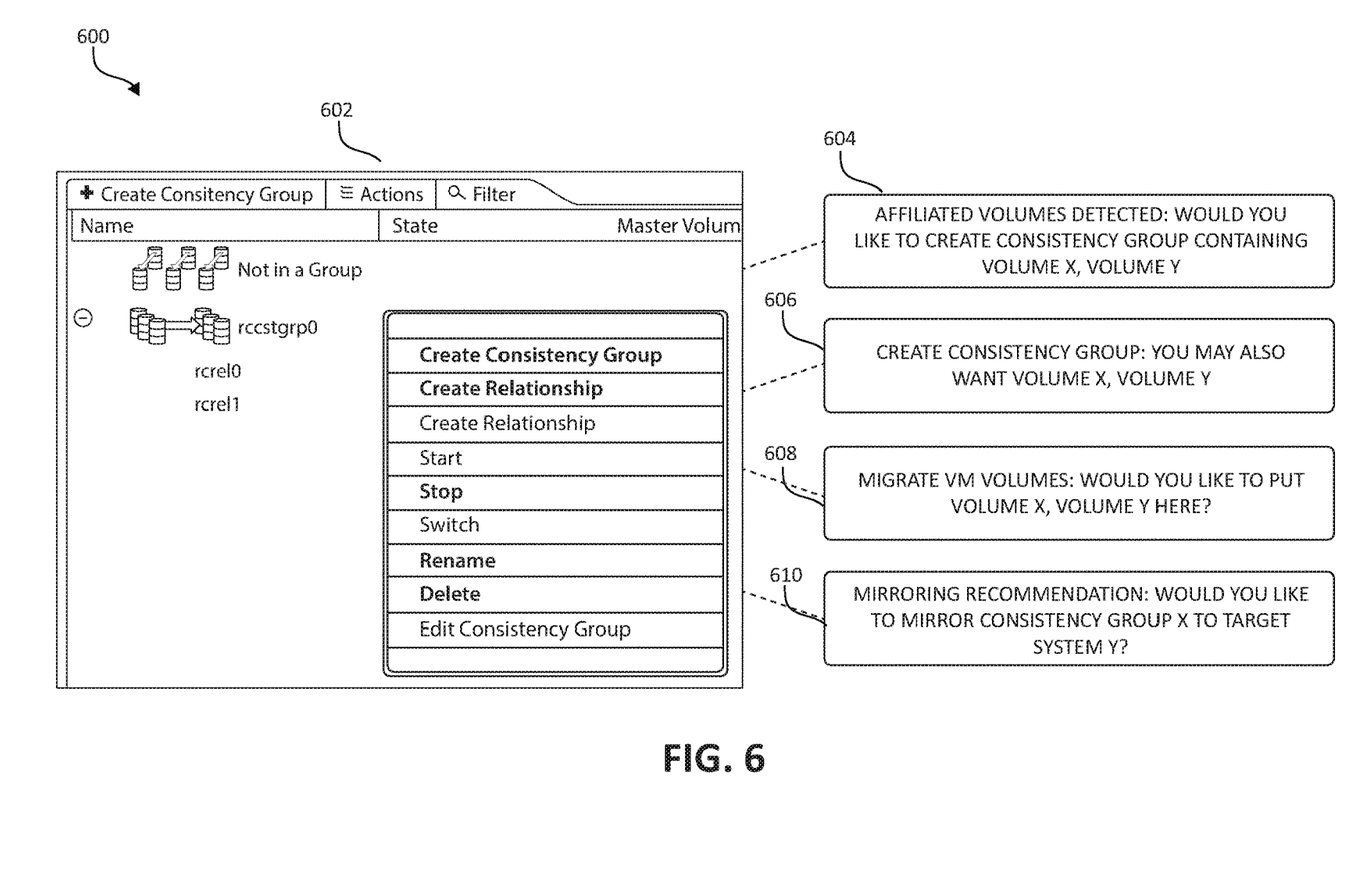
FIG. 6 is an additional block diagram depicting exemplary user prompts for volume management in a data storage environment, in accordance with various aspects of the present invention.

The detected affiliations between VMs and their associated storage volumes are then used to provide the recommendations to the user in the form of user prompts, as shown in FIG. 6. FIG. 6 illustrates a diagram 600 depicting exemplary prompts the user may receive while performing a volume affiliation operation, such as creating or modifying a volume consistency group, replication operations, or other grouping services.

Diagram 600 includes a screenshot 602 having prompts therein that a user may encounter when performing the volume affiliation operation. Based upon network traffic analyses obtained by the network sniffing operation, the user may receive such as prompt 604 where affiliated volumes have been detected, wherein the system offers to automatically create services, tiers, or consistency groups using the detected affiliations. Thus, prompt 604 may automatically create, or offer to create, the volume affiliation operation between volume "x" and volume "y", which the network sniffing operation has determined to be affiliated between VMs (e.g. "Would you like to create a consistency group containing volume x, volume y?").

Additionally, when forming or modifying an existing volume affiliation operation (e.g. consistency group, tier, or service), the user may receive prompt 606, which suggests additional volumes be added based upon the VMs/volumes the user has already affiliated, as detected by the network sniffing operation (e.g. when creating a consistency group, offering "You may also want to add volume x, volume y").

Prompt 608 illustrates a prompt the user may receive when the network sniffing operation has detected that a majority of a VMs (and its volumes) traffic is being transferred to a separate location. Thus, prompt 608 may automatically migrate, or offer to migrate, the VM and its volumes to the environment (e.g. storage array) in which most of its traffic is located (e.g. "Would you like to place volume x, volume y here?").

The user may also receive a recommendation such as in prompt 610, in which the network sniffing operation has detected optimal mirroring of a volume grouping to a target system. Thus, prompt 610 may automatically mirror, or offer to mirror consistency group "x" to target system 'y' (e.g. "Would you like to mirror consistency group x to target system y?").

Here again, it should be noted that the aforementioned prompts are provided herein as examples only. In an actual implementation, one of ordinary skill in the art would appreciate that a wide array of recommendation prompts or otherwise automatic volume affiliation operations may be received and performed in accordance with the spirit and scope of the present invention. Additionally, it should be noted that the term "recommendation" used throughout the described embodiments are suggestions presented by the storage system via the aforesaid prompts to the user, using such as a graphical user interface (GUI) as shown above, a command line interface (CLI), or other such means as commonly known in the art.

Scheduled Task

Figure 7:
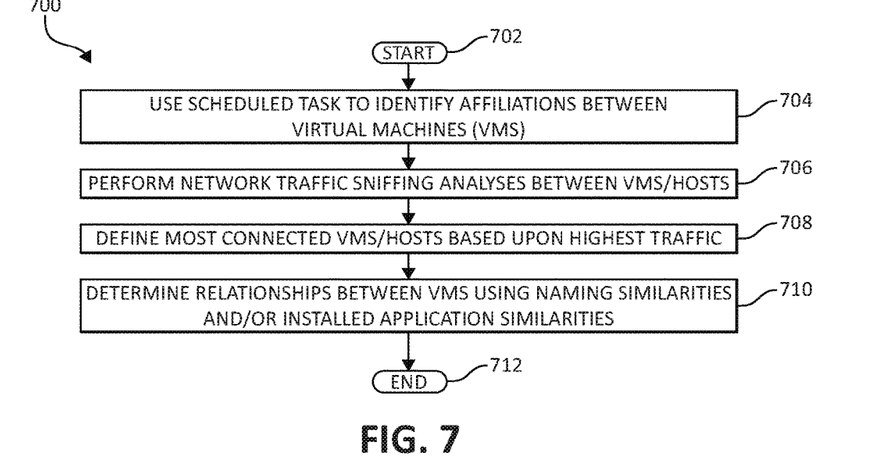
FIG. 7 is an additional flowchart diagram illustrating an exemplary method for volume management in a data storage environment by a processor, again in which aspects of the present invention may be implemented.

In some embodiments, a task may be scheduled during a predetermined time period and/or be performed for a predetermined timeframe in which to perform the network sniffing operation. FIG. 7 illustrates a method 700 for performing the scheduled task for volume management in a data storage environment, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins (step 702) using the scheduled task during the predetermined time period and/or performed for the predetermined timeframe to identify affiliations between VMs (step 704), by performing the network sniffing operation for detecting traffic analyses between the VMs/hosts (step 706). The most-connected VMs/hosts are defined based upon which VMs/hosts have the highest traffic therebetween and/or other pattern analysis (step 708), and thus, affiliations are formed. The affiliations and relationships may also be determined using detected naming similarity schemes of the VMs and their associated volumes, similarities between installed application packages, or other characteristics as defined by the user (step 710). The method 700 ends (step 712).

Push Recommendations

Figure 8:
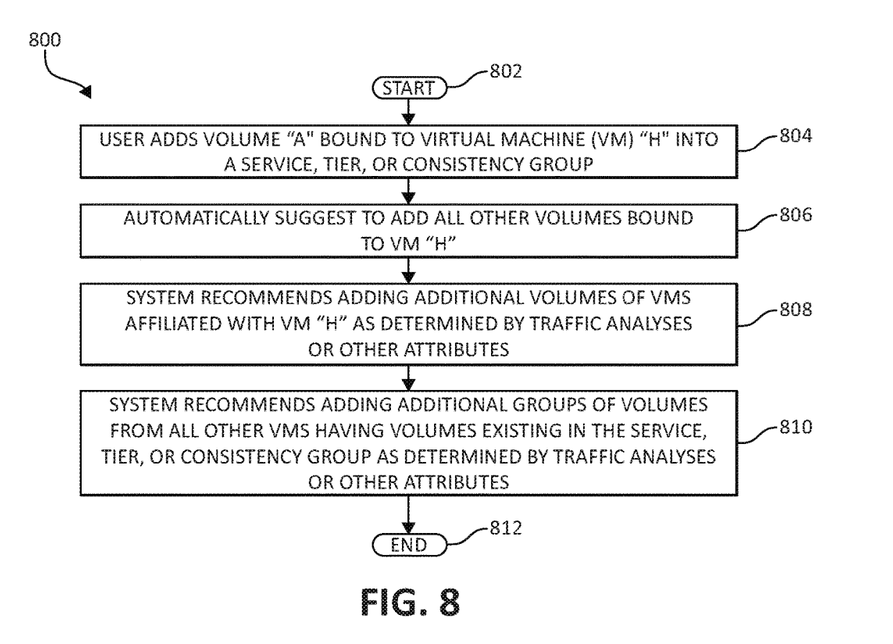
FIG. 8 is an additional flowchart diagram illustrating an exemplary method for volume management in a data storage environment by a processor, again in which aspects of the present invention may be implemented.

As aforementioned, in some embodiments, when a user creates or modifies an existing volume affiliation operation, (push) recommendations may be provided to the user to add additional volumes in which affiliations have been detected by the network sniffing operation. FIG. 8 illustrates a method 800 for performing the push recommendations for volume management in a data storage environment, in accordance with one embodiment of the present invention. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

The method 800 begins (step 802) when a user adds a volume (e.g. volume "A") bound to a particular VM (e.g. VM "H") into a volume affiliation operation (step 804). As discussed, the volume affiliation operation may comprise a consistency group, service, or storage tier. Based upon network information, the system may automatically suggest to add all other volumes bound to VM "H" (step 806). Additionally, the system may recommend adding additional volumes of VMs affiliated with VM "H", as determined by traffic analyses obtained by the network sniffing operation (step 808). Furthermore, the system may recommend adding additional groups of VMs/volumes from all other VMs having volumes existing in the volume affiliation operation, again, as determined by traffic analyses, or other attributes (step 810). The method 800 ends (step 812).

Pull Recommendations

Figure 9:
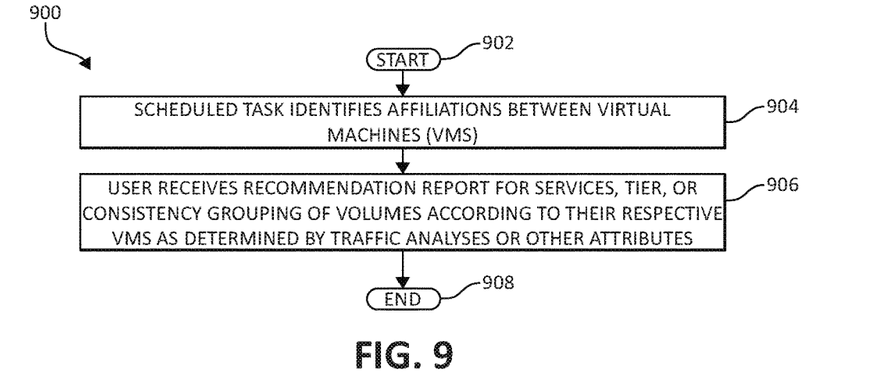
FIG. 9 is an additional flowchart diagram illustrating an exemplary method for volume management in a data storage environment by a processor, again in which aspects of the present invention may be implemented.

Subsequent to a completion of the scheduled task, as described above, the user may receive a recommendation report of identified volumes optimal for grouping in volume affiliation operations according to their respective VMs. FIG. 9 illustrates a method 900 for performing the pull recommendations for volume management in a data storage environment, in accordance with one embodiment of the present invention. The method 900 may be performed in accordance with the present invention in any of the environments depicted in FIGS. 1-4, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

The method 900 begins (step 902) as the scheduled task identifies affiliations between particular VMs (step 904). Subsequent to a completion of the scheduled task, the user receives a recommendation report for volume affiliation operations (e.g. storage services, tier, or consistency grouping) of volumes optimal for grouping according to their respective VMs, as determined by traffic analyses obtained between the VMs by the network sniffing operation, and/or other attributes as defined by the user (step 906). The method 900 ends (step 908).

VM Migration Recommendations

In some embodiments, when identifying that a majority of a particular VM's traffic is transferred to another location, while taking into consideration mirroring traffic, the VM and its associated volumes may be migrated to the location the majority of the traffic is residing. The migration of the VM and associated volumes may be performed automatically, or a recommendation may be provided to the user to do so in order to gain efficiency and lower latency. The migration mechanisms may be used both for a situation in which affiliated volumes of the VM reside on different systems, as well as for a situation in which a VM has bounding volumes on several systems. In the latter case, traffic of the VM and its associated volumes may be analyzed to deduce in which system a majority of the traffic is occurring by the network sniffing operation, and therefore the VM and its associated volumes may be migrated to such system.

Figure 10:
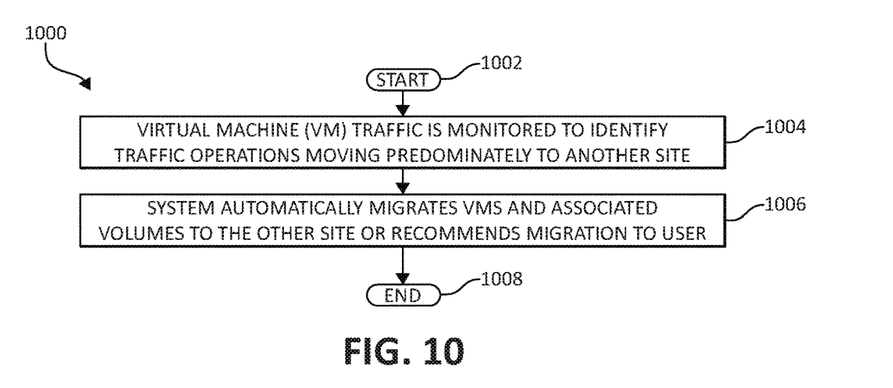
FIG. 10 is yet an additional flowchart diagram illustrating an exemplary method for volume management in a data storage environment by a processor, again in which aspects of the present invention may be implemented.

FIG. 10 illustrates a method 1000 for performing the VM migration for volume management in a data storage environment, in accordance with one embodiment of the present invention. The method 1000 may be performed in accordance with the present invention in any of the environments depicted in FIGS. 1-4, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

The method 1000 begins (step 1002) as VM traffic is monitored by the network sniffing operation to identify traffic operations moving predominately to another site (step 1004). The system identifies the site and either automatically migrates the VM(s) and associated volumes to the other site, or recommends the migration be performed by the user (step 1006). In a situation where the VM has bounding volumes on several systems, the VM's traffic may be analyzed to determine the most appropriate system to migrate the VM and its associated volumes based upon the location in which the traffic predominately occurs. The method 1000 ends (step 1008).

Mirroring Target/RPO Recommendation

In some embodiments, when a user selects a recovery point object (RPO) and mirroring for a volume (e.g. volume "A"), taken into consideration all of volume "A" s affiliated volumes, and for those who have replication functionality with the same RPO, a recommendation may be provided that the most-used targets mirror volume "A". That is, once the user selects a target for volume "A" s mirroring, the system may recommend to add volume "A" s affiliated volumes which do not currently have mirroring functionality to share the same mirroring properties as volume "A" (RPO and target). Additionally, a recommendation may be provided to move the mirroring of affiliated volumes from their current target/RPO to volume "A"s target/RPO.

Figure 11:
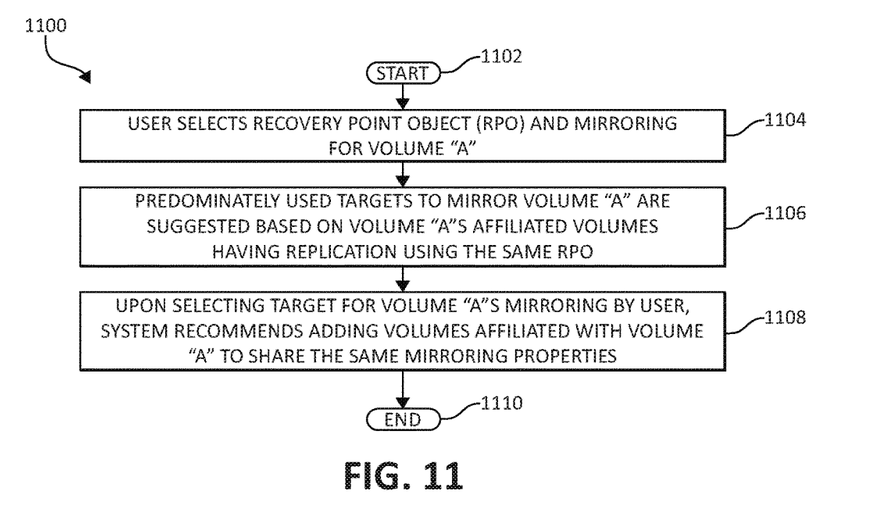
FIG. 11 is still an additional flowchart diagram illustrating an exemplary method for volume management in a data storage environment by a processor, again in which aspects of the present invention may be implemented.

FIG. 11 illustrates a method 1100 for performing the mirroring recommendations for volume management in a data storage environment, in accordance with one embodiment of the present invention. The method 1100 may be performed in accordance with the present invention in any of the environments depicted in FIGS. 1-4, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

The method 1100 begins (step 1102) when the user selects an RPO and mirroring for volume "A" (step 1104). Predominately used targets to mirror volume "A" are recommended based on volume "A" s affiliated volumes having replication using the same RPO (step 1106). Upon selecting the target for volume "A" s mirroring by the user, the system recommends adding volumes affiliated with volume "A" to share the same mirroring properties as volume "A" (step 1108). The method 1100 ends (step 1110).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for volume management in a data storage environment, by a processor device, comprising:
performing a network sniffing operation between virtual machines to detect relationships between the virtual machines and thereby identify storage volume candidates for subsequent storage volume affiliation operations; wherein the storage volume affiliation operations include volume consistency grouping operations comprised of mirroring writes from a first storage volume to a second storage volume within the respective virtual machines in logical order of occurrence according to timestamps of the writes, volume services grouping operations, and volume migration operations; and the network sniffing operation detects the relationships based on network traffic or alternative similarity attributes of an existing placement of the virtual machines thereby deducing affiliations of storage volumes between the virtual machines such that, during the storage volume affiliation operations, the existing placement of the virtual machines is not modified; and
upon creation of a new storage volume affiliation operation or a modification of an existing storage volume affiliation operation, recommending the identified candidates be added to the new or existing storage volume affiliation operation, wherein the recommendation is provided via a prompt querying a user for input as to whether to add the identified candidates to the new or existing storage affiliation operation.

2. The method of claim 1, further including creating a scheduled task wherein to perform the network sniffing operation, the scheduled task running during a predetermined timeframe to monitor the network traffic or the alternative similarity attributes between the virtual machines.

3. The method of claim 2, further including providing a recommendation report to the user of the identified candidates for subsequent storage volume affiliation operations subsequent to a completion of the scheduled task.

4. The method of claim 1, further including, upon determining by the network sniffing operation that affiliated virtual machines reside on separate physical locations, migrating the storage volumes such that the storage volumes reside on a same physical location.

5. The method of claim 4, further including detecting configuration properties of the storage volumes between the virtual machines and recommending to extend the detected configuration properties to the identified candidates for the subsequent storage volume affiliation operations, wherein the recommendation is provided via the prompt.

6. A system for volume management in a data storage environment, the system comprising:
a processor device, wherein the processor device:
performs a network sniffing operation between virtual machines to detect relationships between the virtual machines and thereby identify storage volume candidates for subsequent storage volume affiliation operations; wherein the storage volume affiliation operations include volume consistency grouping operations comprised of mirroring writes from a first storage volume to a second storage volume within the respective virtual machines in logical order of occurrence according to timestamps of the writes, volume services grouping operations, and volume migration operations; and the network sniffing operation detects the relationships based on network traffic or alternative similarity attributes of an existing placement of the virtual machines thereby deducing affiliations of storage volumes between the virtual machines such that, during the storage volume affiliation operations, the existing placement of the virtual machines is not modified; and
upon creation of a new storage volume affiliation operation or a modification of an existing storage volume affiliation operation, recommends the identified candidates be added to the new or existing storage volume affiliation operation, wherein the recommendation is provided via a prompt querying a user for input as to whether to add the identified candidates to the new or existing storage affiliation operation.

7. The system of claim 6, wherein the processor device creates a scheduled task wherein to perform the network sniffing operation, the scheduled task running during a predetermined timeframe to monitor the network traffic or the alternative similarity attributes between the virtual machines.

8. The system of claim 7, wherein the processor device provides a recommendation report to the user of the identified candidates for subsequent storage volume affiliation operations subsequent to a completion of the scheduled task.

9. The system of claim 6, wherein the processor device upon determining by the network sniffing operation that affiliated virtual machines reside on separate physical locations, migrates the storage volumes such that the storage volumes reside on a same physical location.

10. The system of claim 9, wherein the processor device detects configuration properties of the storage volumes between the virtual machines and recommending to extend the detected configuration properties to the identified candidates for the subsequent storage volume affiliation operations, wherein the recommendation is provided via the prompt.

11. A computer program product for volume management in a data storage environment, by a processor device, the computer program product embodied on a non-transitory computer-readable storage medium having computer-readable program code portions stored therein, the computer-readable program code portions comprising:

an executable portion that performs a network sniffing operation between virtual machines to detect relationships between the virtual machines and thereby identify storage volume candidates for subsequent storage volume affiliation operations; wherein the storage volume affiliation operations include volume consistency grouping operations comprised of mirroring writes from a first storage volume to a second storage volume within the respective virtual machines in logical order of occurrence according to timestamps of the writes, volume services grouping operations, and volume migration operations; and the network sniffing operation detects the relationships based on network traffic or alternative similarity attributes of an existing placement of the virtual machines thereby deducing affiliations of storage volumes between the virtual machines such that, during the storage volume affiliation operations, the existing placement of the virtual machines is not modified; and an executable portion that, upon creation of a new storage volume affiliation operation or a modification of an existing storage volume affiliation operation, recommends the identified candidates be added to the new or existing storage volume affiliation operation, wherein the recommendation is provided via a prompt querying a user for input as to whether to add the identified candidates to the new or existing storage affiliation operation.

12. The computer program product of claim 11, further including an executable portion that creates a scheduled task wherein to perform the network sniffing operation, the scheduled task running during a predetermined timeframe to monitor the network traffic or the alternative similarity attributes between the virtual machines.

13. The computer program product of claim 12, further including an executable portion that provides a recommendation report to the user of the identified candidates for subsequent storage volume affiliation operations subsequent to a completion of the scheduled task.

14. The computer program product of claim 11, further including an executable portion that, upon determining by the network sniffing operation that affiliated virtual machines reside on separate physical locations, migrates the storage volumes such that the storage volumes reside on a same physical location.

15. The computer program product of claim 14, further including an executable portion that detects configuration properties of the storage volumes between the virtual machines and recommending to extend the detected configuration properties to the identified candidates for the subsequent storage volume affiliation operations, wherein the recommendation is provided via the prompt.

* * * * *